P. E. MERRIHEW.
GRAIN SEPARATOR.

No. 181,462.

3 Sheets—Sheet 1.

Patented Aug. 22, 1876.

WITNESSES
F. W. Howard
Jno. S. Slater

INVENTOR
Thomas E. Merrihew
by
Mason Fenwick Lawrence
Attorneys.

3 Sheets—Sheet 2.
P. E. MERRIHEW.
GRAIN SEPARATOR.
No. 181,462. Patented Aug. 22, 1876.
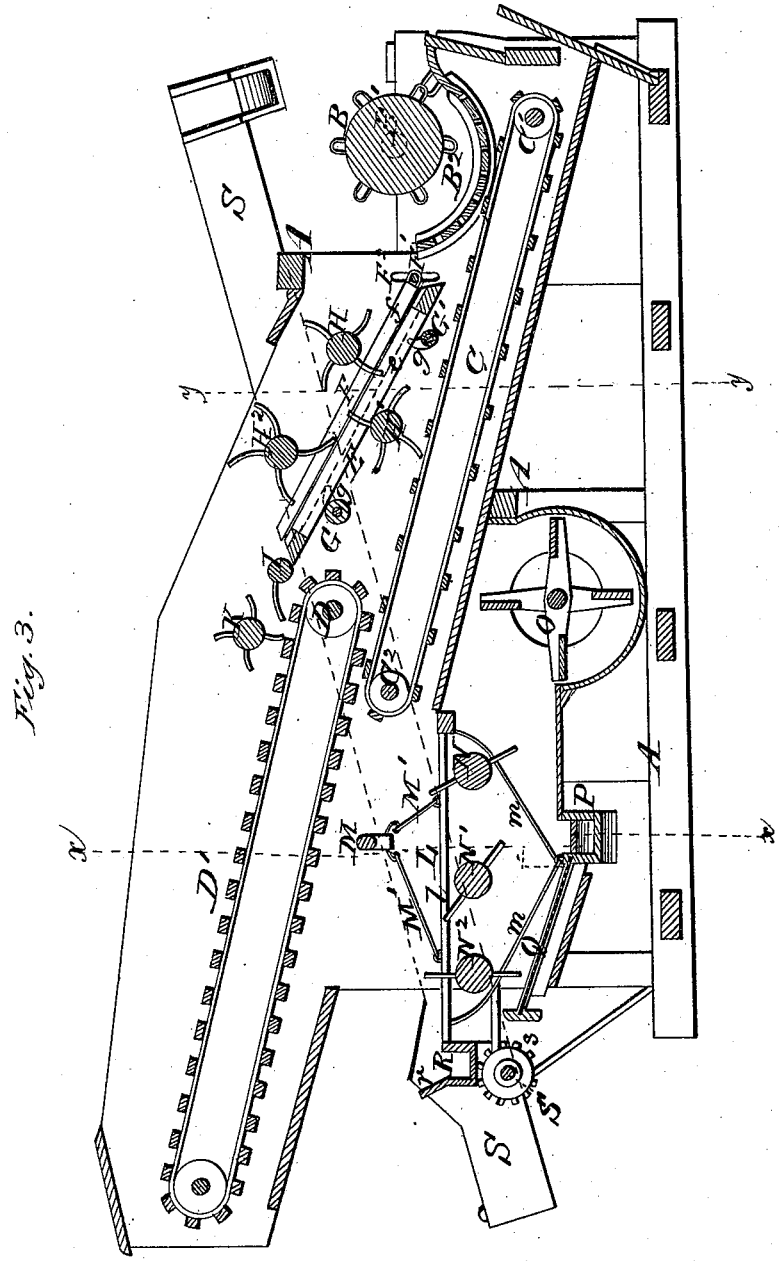
WITNESSES.
F. W. Howard
Jno. S. Slater.
INVENTOR.
Phineas E. Merrihew
by Mason Fenwick Lawrence
Attorneys.

P. E. MERRIHEW.
GRAIN SEPARATOR.
No. 181,462.
3 Sheets—Sheet 3.
Patented Aug. 22, 1876.
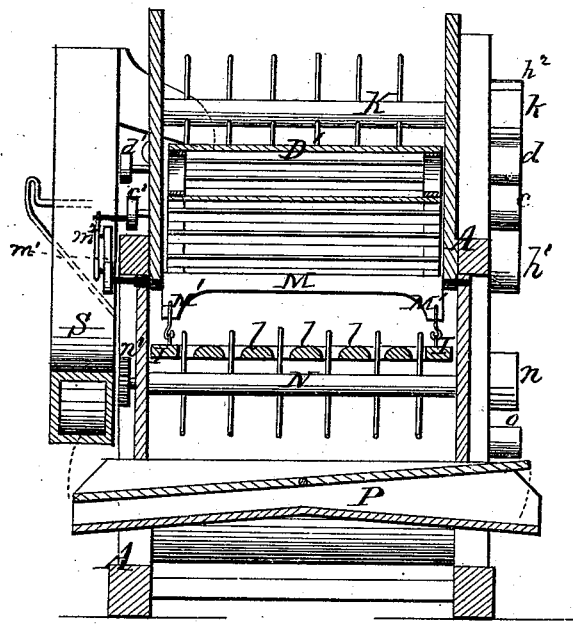
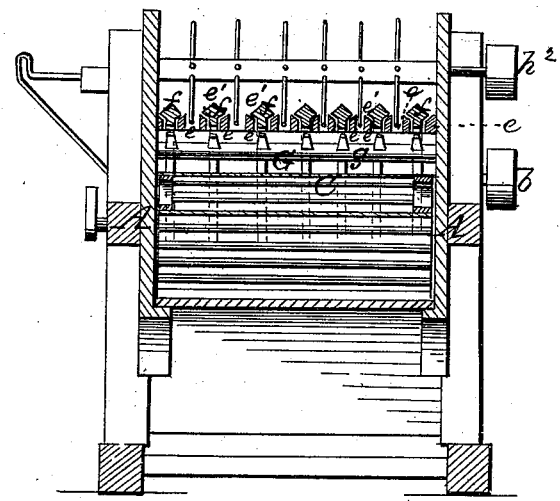
WITNESSES
F. W. Howard
Jno. S. Slater
INVENTOR
Phineas E. Merrihew
by
Mason Fenwick Lawrence
Attorneys.

UNITED STATES PATENT OFFICE.

PHINEAS E. MERRIHEW, OF FOND DU LAC, WISCONSIN.

IMPROVEMENT IN GRAIN-SEPARATORS.

Specification forming part of Letters Patent No. 181,462, dated August 22, 1876; application filed December 18, 1875.

*To all whom it may concern:*

Be it known that I, PHINEAS E. MERRIHEW, of Fond du Lac, in the county of Fond du Lac and State of Wisconsin, have invented certain new and useful Improvements in Thrashing-Machines; and I do hereby declare the following to be a full, clear, and exact description of the same, reference being had to the accompanying drawings, forming part of this specification, in which—

Figure 1:
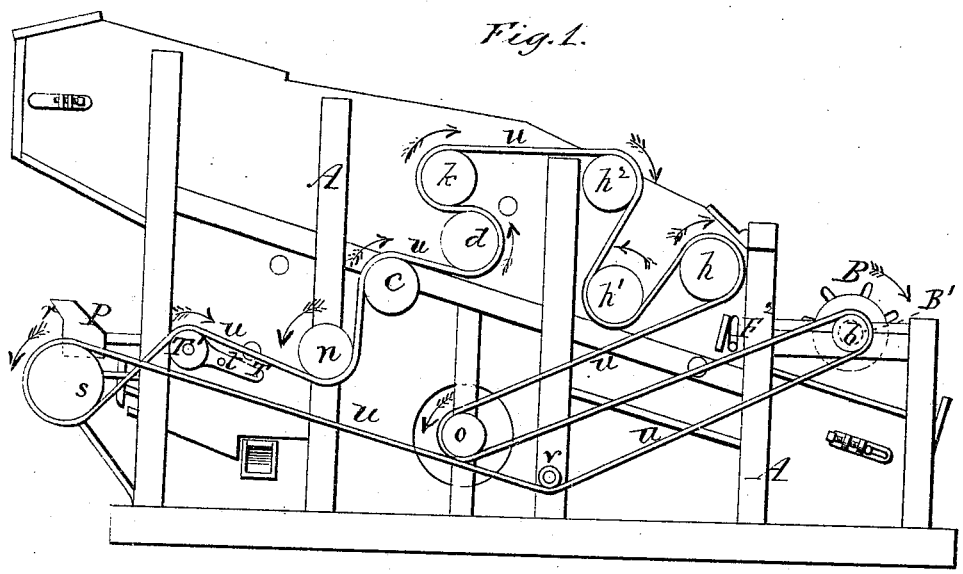
Figure 2:
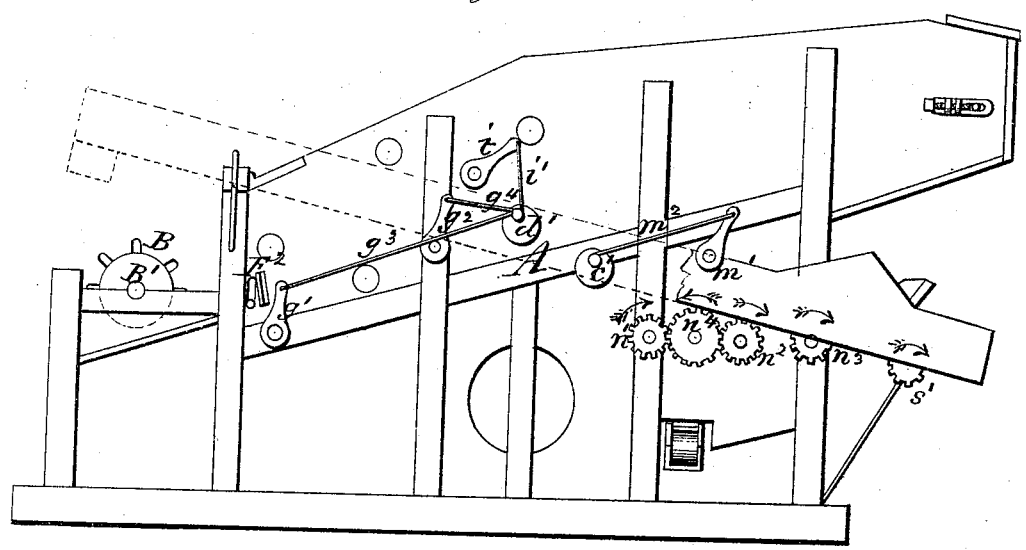

Figures 1 and 2 are views in elevation of the right and left sides of the machine; Fig. 3, a longitudinal vertical section of the same, exhibiting the interior construction thereof. Fig. 4 is a vertical cross-section on the line $x$ $x$; and Fig. 5, a vertical cross-section on the line $y$ $y$, Fig. 3, of my invention.

The nature of my invention consists in certain constructions, combinations, and arrangements of parts, in the manner to be hereinafter shown and specifically claimed, whereby greater efficiency is secured in the separation of the thrashed grain from the straw at a point between the thrashing-cylinder and the lower end of the straw-carrier proper, and in the carriage of the thrashed straw from the cylinder to the rear end of the machine, from which it is delivered to be stacked away or otherwise disposed of.

In order that others skilled in the art to which it pertains may be enabled to make and use my improved thrashing-machine, I will now proceed to describe the same with references to the drawings, in which similar letters designate like parts of my invention.

A represents the frame of the machine; B, the thrashing-cylinder, which revolves upon the shaft $B^1$; $B^2$, the concave; and C and $D'$, grain, chaff, and straw carriers. The rear portion of the concave $B^2$ is slotted, in order to permit the grain which becomes separated from the chaff during the act of thrashing to pass through between the bars to the grain-carrier C, which is operated by the shafts $C^1$ $C^2$, and thence to be carried to the separating or shoe portion of the machine. Immediately in rear of this slotted portion of the concave $B^2$, and in close proximity to it, is an inclined floor, E, provided with longitudinal slats $e$, the upper edges of which are beveled outwardly, as shown in Fig. 5, and which slats, for a portion of their length, are provided with slots $e'$.

This floor is so arranged as to bring its lower end nearly on a plane with the upper, rear, and slotted portion of the concave $B^2$, and thus serve as a continuation of the same, and to bring its upper or rear end a short distance above and in front of the shaft D of the lower end of the straw-carrier $D'$.

Above this stationary inclined slotted floor is a lifting or tilting floor, F, also provided with longitudinal slats $f$, the upper surfaces of which are semi-lozenge-shaped, and the lower portions constructed in such a manner as will permit them to be received between the slats $e$ of the under floor E, as shown in Fig. 5, and rest on the beveled surfaces thereof. This lifting-floor is hinged or hung at its lower end, as shown at $F^1$, in vertical oblong slots $F^2$ of the frame A, to prevent longitudinal displacement, but at the same time permit an upward and downward movement, the extent of which may be regulated by the length of the slots, while the upper end is left free to move vertically to a limited extent.

G $G'$ are shafts, provided with teeth or cams $g$, arranged underneath the floors E and F in such a manner as will enable these cams, as the shafts are vibrated, to come in contact with the under edges of the slats $f$, which project down through the slots between the slats $e$ of the floor E, and thus communicate an alternating lifting or tilting motion to the respective ends of said inclined floor F.

H $H^1$ $H^2$ are revolving shafts, provided with fingers or beaters, and arranged (one underneath and two above the floors E F) in such a manner as to cause their fingers to overlap each other, as shown in Fig. 3. These fingers move in the space between the slats of the upper floor F and in the slots $e'$, formed in the slats $e$ of the floor E, and the shafts are so speeded relatively that the fingers of one do not interfere or come in contact with the fingers of the other.

I is a lifting-fork, arranged immediately at the upper or rear end of the floors E F, and the fingers of which overhang the carrier $D'$, closing the space between the carrier and the floors; and K is an auxiliary beater, to take the straw from the lifting-fork and accelerate ts motion along the endless carrier D' toward the place of deposit.

L is a raddle or screen arranged in the shoe of the machine, provided with longitudinal slats $l$, and suspended so as to vibrate longitudinally from the vibrating shaft M by means of the hinged rods M', and partially supported and controlled by the spring-rods $m$.

N N$^1$ N$^2$ are shafts, provided with fingers or beaters, and arranged underneath the raddle L in such a manner as will permit the fingers to project up between the slats $l$, as shown in Figs. 3 and 4.

O is the fan for furnishing a blast to drive away the chaff, and P is the receiving or conducting spout for the separated grain as it comes from the sieve Q. This receiving or conducting spout is provided with two discharge-spouts, one on each side of the machine, to facilitate the removal of the thrashed grain.

R is a receiving-spout attached to the rear end of the raddle L, provided with a fender, and designed to catch the unthrashed heads and conduct them to the elevator S, operated by the shaft S', by which they are carried back and discharged into the machine to be again thrashed.

At the rear end of the machine, as shown in Fig. 1, is a belt-tightener, consisting of a lever, T, pivoted at $t$, and provided with a friction drum or pulley, T', over which the driving-belt U passes, and by means of which device the belt may be brought to any desired degree of tension, in a very expeditious manner, by simply elevating or lowering the tightening-drum by means of the lever-handle attached thereto. This device may also be used to instantaneously stop all that portion of the machine in rear of the thrashing-cylinder without throwing off the belting, as when the pressure of the drum against the belt is removed the band will not hold, but slip upon the pulleys.

V is a pulley or guide-roller fixed near the bottom of the machine, and below the line of working pulleys carrying the belt, underneath which the belt passes, and is thus kept from interfering with the working of the various parts of the machine, as it might otherwise do, and at the same time enables a single belt to perform the duties of several belts or gears of wheels. The shafts B$^1$, C$^2$, D, H, H$^1$, H$^2$, K, N, O, and S' are provided upon one of their ends with pulleys $b\ c\ d\ h\ h^1\ h^2\ k\ n\ o\ s$, all arranged upon the same side of the machine, to receive and carry the belt U; and the shaft D, upon its opposite end, is provided with the eccentric $d'$; and the shaft C$^2$ of the grain-carrier C is provided upon its opposite end with the eccentric $c'$; and the shaft N on its opposite end is provided with the cog-wheel $n^1$. The shaft S' upon its opposite end is also provided with a cog-wheel, $s'$. The eccentric $d'$ is connected to a crank, $i$, upon the end of the shaft of the lifting-fork I by means of the rod $i'$; and to cranks $g^1\ g^2$ upon the ends of the shafts G G', which give movement to the floor F, by means of rods $g^3\ g^4$, and by this simple arrangement the desired motion of these parts is secured. The eccentric $c'$ is connected by a rod, $m^2$, to a crank, $m^1$, on the end of the vibrating shaft M, thus giving a longitudinal motion to the suspended raddle L when the machine is in operation. The shafts N$^1$ N$^2$ are provided with cog-wheels $n^2\ n^3$, and between the wheels $n^1$ and $n^2$ is placed a gear-wheel, $n^4$, to change the motion communicated by the shaft N to the succeeding shaft, and thus cause the two to revolve in the same direction in unison. A similar wheel (not shown) is to be placed between the cog-wheels $n^3$ and $s'$, for the purpose of transmitting a similar motion to the shaft N$^2$.

Having thus described the construction of my machine, I will now proceed to explain the manner in which motion is communicated to the various parts of my invention.

The endless belt U is passed over and under the pulleys $c\ h\ h^1\ h^2\ k\ d\ o\ n$, and above or over the tightening-drum T', then under the pulley $s$, and thence, crossing itself, is brought back toward the front of the machine, passing underneath the guide-pulley V and over the pulley $b$ of the thrashing-cylinder, as shown in Fig. 1. When the proper connection between the cylinder-shaft B$^1$ and the motive power has been made and the machine started, the continuous belt U will cause the pulleys over and under which it passes to revolve in the directions indicated by the arrows, Figs. 1 and 3.

It is easily to be perceived that, as these pulleys and the shafts which carry them revolve, their motion will be communicated to the eccentrics $c'\ d'$ and to the cog-wheels $n^1\ s'$, and also that, by means of the rods $g^3\ g^4$, which connect the shafts G G' with the shaft D and the connecting-rod $i'$, the lifting-floor F and lifting-fork I are operated.

It will also be seen that, as the shaft N is revolved by means of the pulley $n$, the cog-wheel $n^1$ transmits motion through the intermediate wheel $n^4$ to the shaft N$^1$, and that the cog-wheel $s'$ upon the shaft S' through the medium of a similar wheel, (not shown,) communicates a rotary motion to the shaft N$^2$, and the whole series of beaters upon these shafts are thus brought to revolve in the same direction, and relatively to each other. At the same time the vibrating shaft M is operated by the eccentric $c'$ on the end of the shaft C$^2$, the connecting-rod $m^2$, and the crank $m^1$, arranged and combined as shown in Fig. 2.

It will thus be seen that comparatively little machinery is required to make my invention effective, and that this machinery is arranged in a compact and convenient manner.

Its operation is equally simple and complete. Supposing the machine to be in motion, the thrashed grain that does not fall between the slats of the concave B$^2$ upon the grain-carrier C is driven, with the straw and chaff, up on the inclined floors E F by the revolutions of the cylinder B, where it undergoes a thorough beating and shaking from the beaters on the revolving shafts H H¹ H², which separate the straw and chaff from the grain, permitting the latter to fall through between the slats of the floors upon the grain-carrier C and apron underneath, while the former are carried onward toward the straw-carrier D'. The lifting-floor F, by its alternating lifting motion, sifts the grain from the chaff and straw, the movements being very much the same as those made when sifting by hand. I find this lifting-floor to be a valuable auxiliary to the beaters above and below it, and that it materially aids in expediting the separation of the grain from the straw and chaff. The lifting-fork I receives the straw and chaff from the lifting-floor F, and passes it on to the auxiliary beater K, from whence it is carried, by the carrier D', to the stack or other place of deposit, while the fine chaff, grain, and unthrashed heads find their way to the shoe of the machine by means of the carrier C and through the slots in the straw-carrier. Upon reaching the shoe of the machine, the grain, chaff, and unthrashed heads fall upon the longitudinally-vibrating raddle L, where the sifting and separating process is again repeated, the beaters N N¹ N² underneath the raddle thoroughly agitating the mass as it falls upon them, while at the same time the blast from the fan drives away the chaff, leaving the grain free to fall between the slats of the raddle upon the sieve or screen Q, from whence it finds its way into the receiving-spout P. The unthrashed heads, not being able to pass through the slots of the raddle L, find their way into the receiving-spout R, whence they are carried, by the elevator S, back to the cylinder to be thrashed over again. In some cases it may be practical to place all the beaters H H¹ H² in the same plane above or below the lifting-floor. It might also be practical to substitute for these beaters, and for the lifting-floor and cam-shafts, an endless intermediate inclined elevator similar to D'.

Having thus described my invention, what I claim, and desire to secure by Letters Patent, is—

1. An intermediate inclined moving slatted elevating-floor, in combination with the thrashing-cylinder and concave, and straw-carrier, substantially as described.

2. In combination with the inclined slatted elevating-floor, straw-carrier, and thrashing-cylinder, the revolving beaters thereof, substantially as and for the purposes set forth.

3. The horizontally suspended and supported longitudinally-vibrating raddle L, in combination with the revolving beaters N N¹ N² of the shoe, whose fingers are adapted to work between the slats of said raddle, substantially as and for the purposes described.

4. In a thrashing-machine, the combination of the intermediate slatted or slotted inclined and moving elevating-floor and its beaters with the thrashing-cylinder and its concave, lifting-fork, auxiliary beater, and straw-carrier, substantially as and for the purpose described.

Witness my hand in matter of my application for a patent for improvement in thrashing-machines.

PHINEAS E. MERRIHEW.

Witnesses:
GEO. P. KNOWLES,
JOHN SPENCE.